Aug. 15, 1933.  W. OTTO  1,922,976

COURSE INDICATOR FOR REPRODUCING THE INDICATION OF A GYROCOMPASS

Filed Aug. 17, 1929  2 Sheets-Sheet 1

Inventor:
Wolfgang Otto.

Aug. 15, 1933.  W. OTTO  1,922,976
COURSE INDICATOR FOR REPRODUCING THE INDICATION OF A GYROCOMPASS
Filed Aug. 17, 1929  2 Sheets-Sheet 2

Inventor:
Wolfgang Otto,
Atty.

Patented Aug. 15, 1933

1,922,976

UNITED STATES PATENT OFFICE 1,922,976

COURSE INDICATOR FOR REPRODUCING THE INDICATION OF A GYROCOMPASS

Wolfgang Otto, Kitzeberg near Kiel, Germany, assignor to the Firm Nederlandsche Technische Handel Maatschappij "Giro," The Hague, Netherlands Application August 17, 1929, Serial No. 386,637, and in Germany January 5, 1928

5 Claims. (Cl. 235—91)

My invention relates to a gyroscopic compass and more particularly to a course indicator for reproducing the indication of a gyro-compass under the control of a follow-up motor.

For the reproduction of the indications of direction by the master compass, in gyroscopic compass installations are used, as a rule, repeater compasses which comprise a dial or compass card horizontally arranged and driven by a follow-up motor controlled by the gyro-compass to repeat its turns, and a lubber's line or reading mark parallel to the keel line. As, however, a simple indication in degrees of the course steered at the time satisfies the practical requirements for most purposes, for instance for the indications of the steering compass, gun tower compass and manœuvering compass, whereas the position of the repeater compass relatively to the ship's hull is of no or little interest for such purposes, it has been proposed prior to my invention to equip the repeater compass solely with an indicating device arranged in any desired position relatively to the ship, for the purpose of reproducing the revolutions of the repeater compass motor. For the purpose in question there has been provided an indicator comprising a hand and a unitary scale comparable with that of a compass dial, say a scale on a single endless band driven by the follow-up motor. While such a device permits of readily ascertaining the indication of the gyro-compass at any time, it requires a certain skill to correctly read the indication given by the hand on the scale, particularly if fractions between successive marks on the scale are to be estimated.

The primary object of my invention is a device which will give direct indication of the position of the gyro-compass in form of a number representing in degrees the angle of the keel line with a given direction, e. g. the north direction. Other objects are to provide a course indicator of simple and rugged construction which is cheap to manufacture and reliable in operation.

My novel indicator comprises, broadly speaking, the combination with a gyro-compass-controlled follow-up motor of a counting gear or train driven by the motor and consisting of several numbering elements, such as wheels, provided with a set of numerals. The numbering elements are coupled together in a certain ratio of transmission to select for exhibition one numeral from those on each wheel and the selected numerals constitute a figure, which is proportional to the number of revolutions performed by the follow-up motor and represents in degrees the angle of the course with a certain direction, e. g. the north direction. From the description to follow it will be apparent that the given direction may be the course to be followed by the ship. The ship may be positioned on that course and the indicator set at zero. Any indication will then give in numerals the angle of the keel line of the ship with the direction of the course.

A preferred embodiment of my invention is illustrated in the accompanying drawings in which Fig. 1 shows a horizontal section through the apparatus, some of the parts being shown in top-view;

Figure 1:
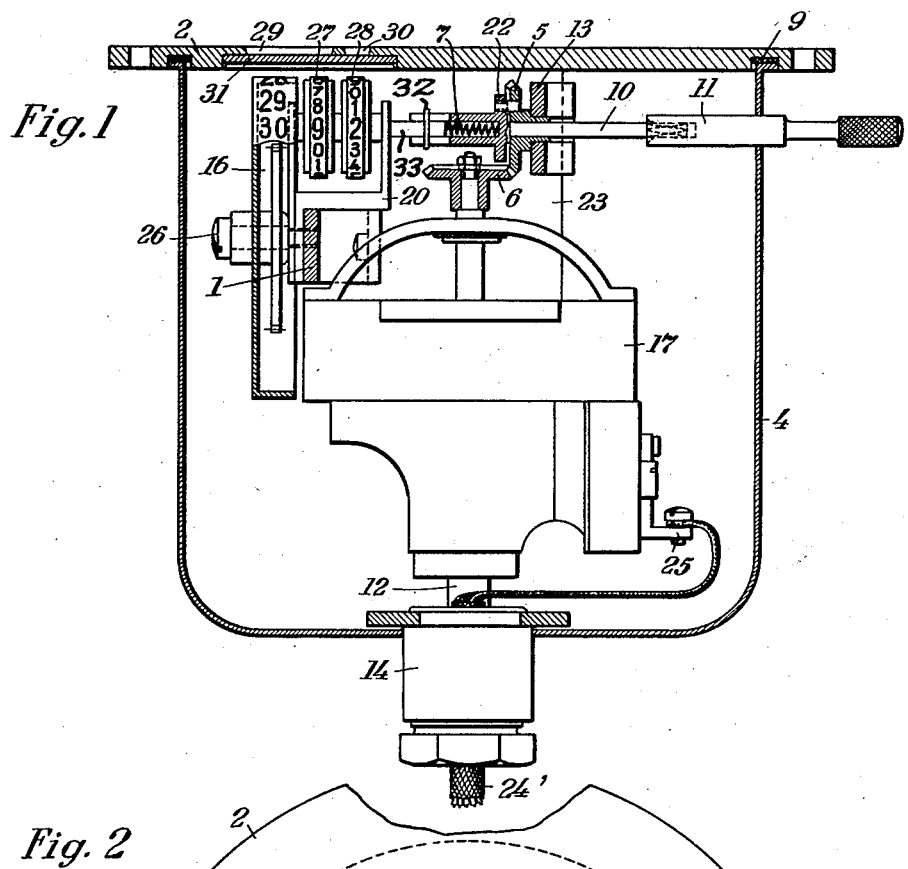

A cylindrical casing 4 is closed at its front by means of a cover 2 provided with a circular groove 9 in which the rim of the casing engages, a suitable washer being inserted to ensure a sealed water-proof closure. From the inner face of the cover 2 standards 23 project to carry at a distance from the cover the follow-up motor 17 attached to the standards by means of bolts 12. These bolts carry on their ends inside of the casing 4 a plate 3 serving to support a stuffing box 14 which projects through an opening in the rear of the casing and encloses a cable 24' containing the electric conductors extending from the master gyro-compass (not shown) to the follow-up motor to control the rotation thereof. Nuts 21 on the threaded ends of the bolts 12 serve to tightly press the casing 4 on the cover 2 and on the plate 3.

The motor 17 which is provided with five terminal clamping screws 25 for attachment of the conductors is of well-known construction familiar to anybody skilled in the gyro-compass art so that a description of its details may be dispensed with herein.

The shaft of the follow-up motor carries a bevel-gear 6 which is in mesh with a bevel-gear 5 arranged for rotation on a shaft 10 and journalled in a bracket 13 which is carried by the standards 23. The shaft 10 is shiftably and rotatably guided in the hub of the bevel-gear 5 and may be clutched thereto for common rotation therewith by means of a pin 22 projecting from a collar on shaft 10 and adapted to engage a suitable hole in the bevel-gear.

Shaft 10 is arranged in alignment with another shaft 24 entering an axial bore of shaft 10 in which a spring 7 is enclosed tending to keep the pin 22 in engagement with the bevel-gear 5. A pin 32 attached to the shaft 33 and guided in longitudinal slots of the shaft 10 connects both shafts for common rotation. Over the free end of shaft 10 a socket-wrench 11 may be slipped for a purpose to be described hereinafter. The shaft 33 is journalled in an extension 20 of a bracket 1 which is mounted to the standards 23 and carries a bolt 26 for rotatably supporting a drum-shaped numbering wheel 16.

This wheel carries on its periphery the numerals 0 to 35. Two numbering wheels 27 and 28 of smaller diameter each provided with the numerals 0 to 9 are mounted on the free end of shaft 24 and are in driving connection with each other and with the big numbering wheel 16 by suitable ten-carrying mechanisms causing the wheels 27 and 16 to move one step when the adjoining wheel of the lower order has completed one revolution, that is to say, wheel 16 is advanced one step when wheel 27 has completed a full turn and wheel 27 is moved one step any time when the wheel 28 has performed a complete revolution. The wheel 28 is fixed on the shaft 24 to be driven by the motor 17, while the numbering wheel 27 is freely rotatable on the shaft and is driven by the ten-carrying mechanism. As ten-carrying mechanisms of this kind are well-known in the art, an illustration and a description thereof is not given herein.

If the wrench 11 is pressed in an inward direction, it will axially displace the shaft 10 to withdraw the pin 22 from the hole in the bevel-gear 5 thereby permitting of manual rotation of shaft 24. In this manner the indicator may be initially set in accordance with the indication of the gyro-compass when the indicator is installed.

Figure 2:
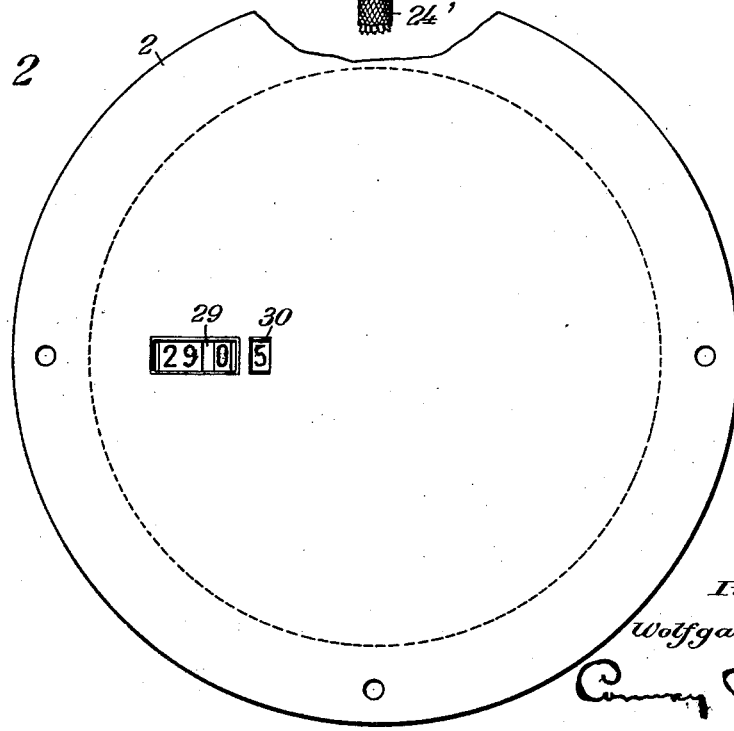
Fig. 2 is an elevation viewed from the right of Fig. 3.
Figure 3:
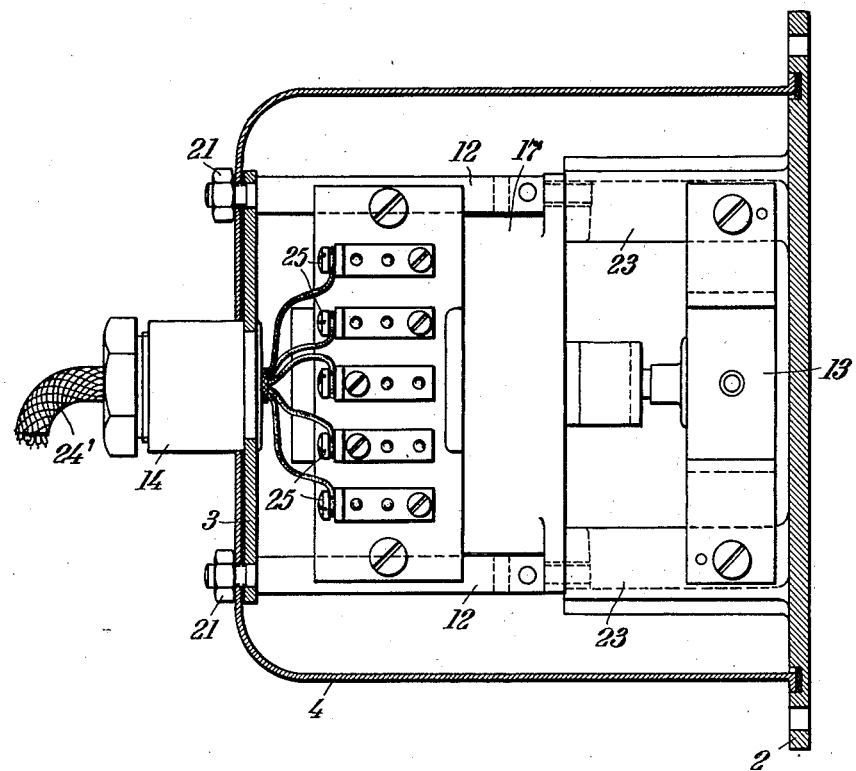
Fig. 3 represents a section taken at right angles to that shown in Fig. 1, the parts enclosed in the casing being shown in elevation.

The cover 2 which may be inserted in any suitable instrument-board regardless of the inclination or position thereof, is provided with two windows 29 and 30 covered by a transparent plate 31 of glass or the like through which those numerals are rendered visible which are in registration with the windows, as will appear from Fig. 2. The three digits visible through the window 29 denote in degrees the angle of the vehicle with the north direction while the digit visible through the window 30 represents decimal fractions of a degree. In the position shown in Fig. 2 the course indicator shows 290.5°. The highest figure which can be indicated is 359.9° and on continued rotation, the figures then jump to 000.0° and thereby indicate that the course of the ship lies exactly to north.

The transmission ratio of the bevel-gears 5 and 6 is preferably so chosen that the motor 17 performs one revolution for a complete turn of the wheel 28, that is to say, for each one degree of change in the course of the ship.

As a matter of course, the ten-carrying mechanism must be constructed to permit of backward rotation of the wheels, as changes of the course take place in both directions.

From the foregoing description it will appear that my invention provides for a course indicator which, in contradistinction to previously known repeater compasses, gives even small differences of degrees in figures the reading of which does not require any skill. Moreover, my novel course indicator is considerably simpler and cheaper than the repeater compasses previously known.

Obviously, other numbering elements than those provided in the afore-described embodiment could be substituted for selecting from their set of numerals a single one for exhibition.

Moreover, I do not wish to limit my invention to the use of a counter in which the highest indication amounts to 360°.

What I claim is:—

1. A gyro-compass controlled course indicator for indicating in numerals the degree of the angle of the line of travel with any given direction, comprising the combination with a gyro-compass-controlled follow-up motor of a counter driven by said motor and including a plurality of interconnected numbering elements each provided with a set of numerals and movable to select for exhibition a single numeral from each set, the selected numerals constituting a figure representing the angle of the line of travel with a given direction.

2. A gyro-compass controlled course indicator for indicating in numerals the degree of the angle of the line of travel with any given direction, comprising the combination with a gyro-compass-controlled follow-up motor of a counter driven by said motor and including a plurality of numbering wheels, the wheel of the highest order bearing numerals 0 to 35 and the remaining wheels bearing each the numerals 0 to 9.

3. A gyro-compass controlled course indicator for indicating in numerals the degree of the angle of the line of travel with any given direction, comprising the combination with a gyro-compass-controlled follow-up motor of a counter driven by said motor and including a plurality of interconnected numbering elements, the element of the highest order being provided with a certain set of numerals and the remaining elements with a different set of numerals, said elements being movable to select for exhibition a single numeral from each of said sets, the selected numerals constituting a figure representing the angle of the line of travel and a given direction.

4. A gyro-compass controlled course indicator for indicating in numerals the degree of the angle of the line of travel with any given direction, comprising in combination a gyro-compass-controlled follow-up motor, a handle, a counter including a plurality of interconnected numbering wheels arranged in juxtaposition, each provided with a set of numerals and movable to select for exhibition a single numeral from each set, and means to selectively clutch said counter to said follow-up motor or to said handle.

5. A gyro-compass controlled course indicator for indicating in numerals the degree of the line of travel with any given direction, comprising in combination a gyro-compass-controlled electric follow-up motor, a counter driven by said motor, said counter including a plurality of interconnected numbering wheels arranged in juxtaposition each provided with a set of numerals and movable in either direction to select for exhibition a single numeral from each set, means including a handle to set said counter, means to selectively clutch said counter to said follow-up motor for operation or to said handle for setting said counter.

WOLFGANG OTTO.